US006411974B1

(12) United States Patent
Graham et al.

(10) Patent No.: US 6,411,974 B1
(45) Date of Patent: Jun. 25, 2002

(54) METHOD TO COLLATE AND EXTRACT DESIRED CONTENTS FROM HETEROGENEOUS TEXT-DATA STREAMS

(75) Inventors: Richard S. Graham, Springville; Rick Lee Pray, Woodland Hills, both of UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/017,718

(22) Filed: Feb. 4, 1998

(51) Int. Cl.[7] .............................................. G06F 17/21
(52) U.S. Cl. .......................... 707/531; 709/328; 717/4; 710/65
(58) Field of Search .................... 707/531, 523, 707/524, 530; 395/704; 717/3–8; 709/328; 710/1, 8, 62, 65

(56) References Cited

U.S. PATENT DOCUMENTS

| | | | | |
|---|---|---|---|---|
| 4,513,391 A | * | 4/1985 | Maddock | 364/900 |
| 4,651,300 A | * | 3/1987 | Suzuki et al. | 364/900 |
| 4,868,765 A | * | 9/1989 | Diefendorff | 364/521 |
| 5,272,628 A | * | 12/1993 | Koss | 364/419.19 |
| 5,303,149 A | * | 4/1994 | Janigian | 364/408 |
| 5,560,009 A | * | 9/1996 | Lenkov et al. | 395/700 |
| 5,701,471 A | * | 12/1997 | Subramanyam | 707/200 |
| 5,859,636 A | * | 1/1999 | Pandit | 345/335 |
| 5,890,165 A | * | 3/1999 | Boudrie et al. | 707/202 |
| 5,956,726 A | * | 9/1999 | Aoyama et al. | 707/102 |

OTHER PUBLICATIONS

Microsoft Press Computer Dictionary, 2nd Ed. Microsoft Press, Redmond, WA. ©1994. p. 243.*

Turbo Pascal Version 3.0 Reference Manual. Borland International, Inc. Scotts Valley CA. ©1983–1985.*

Screen capture of the "Select Printer" dialog box from Corel® WordPerfect® 6.1 for Windows (©1996).*

Screen capture of the "Print" dialog box from Microsoft Word 97 (©1983–1997) Reference pp. 1–2.*

Graham, Ian S. HTML Sourcebook, 3rd Ed. John Wiley and Sons, New York. ©1997. Publishing date Feb. 24, 1997.*

The New Hacker's Dictionary, available at http://scandog.nwe.ufl.edu/programming/jargon/jargon_26.html. Last modified Apr. 2, 1995.*

* cited by examiner

*Primary Examiner*—Joseph H. Feild
(74) *Attorney, Agent, or Firm*—Haynes and Boone, LLP

(57) ABSTRACT

A method extracts desired contents from multiple heterogeneous textual streams and provides normalized data representative of the desired contents. The method selects input streams containing text data wherein the text data of different input streams may differ in format. The method further selects a first set of parse rules corresponding to one input stream and a second set of parse rules, distinct from the first set, which correspond to a second input stream. The invention extracts desired contents from the input streams and provides normalized data which represents the desired contents. The invention selects an output interface and adapts the normalized data representing the desired contents to the output interface. The invention sends the normalized data to the output interface and the output interface is instructed to transform and format the normalized data into device specific data.

20 Claims, 5 Drawing Sheets

METHOD TO COLLATE AND EXTRACT DESIRED CONTENTS FROM HETEROGENEOUS TEXT-DATA STREAMS

BACKGROUND

1. The Field of the Invention

This invention relates to computer software and, more particularly, to novel systems and methods for parsing textual streams and extracting desired contents within textual data from the textual streams and collating the desired contents into an output stream.

2. The Background Art

In today's world, a typical work environment includes one or more computers. The software run on these computers enables users to provide documentation through word processing programs, analyze and track financial information through spreadsheets, plan and organize callendars through planning software, access information through database software and/or providers, etc.

To insure the proper functioning of this software, software companies test each computer program before it is sold to the public. Some companies test their software more extensively than others. Testing their software helps the authors of the software find and correct problems with the software. To accurately track the operation of software, some software engineers program the software to write files as the software is run. These files typically contain a type of log or record of what happened when the software was running. Usually, such a log file is useful to an engineer because when a problem is encountered this file enables someone to go back and look at this file (the "log") and see what types of events occurred before, during, and after the problem.

On large computer programs or large computer systems including several computer programs, the number of errors and/or problems that should be analyzed may become very large. Often the different computer programs and/or different pieces of the computer programs were authored by different software engineers. In testing their portions of the larger system, these isolated engineers may have their own format for files containing information helpful in their debugging of their portion. When all the pieces are placed together a set of heterogeneous log files are usually created containing information that may be helpful in achieving the proper functioning of the computer program. The files are heterogeneous in that they have different formats. For example, one file may have all the errors at the top of the file under a heading marked "ERRORS" with a log of events following. On the other hand, another file may only contain a log of events where the errors are scattered throughout the file marked with a simple "prob:". Depending upon the number of engineers involved and the number of differing log file formats, there may be a good number of heterogeneous log files.

Many software testing teams write separate computer programs for testing computer programs. This testing software will most likely have its own set of log files created as it is run. Some testing software may be quite complicated and create a number of log files. These log files may be heterogeneous for the reasons stated above that the different parts of the program will often be written by different people.

Some testing software may be designed to remotely launch any test which can be run from the command line (e.g., "c:\") on any given operating system. Different tests may be desirable to fully test one or more computer programs. The tests that are likely to be run need not be developed by the same engineer or team. As a result, the log files produced by running any given group of tests can differ radically in format and content. This makes it very difficult for someone trying to interpret the results of a series of tests to analyze the data returned by these tests. The ideal situation would be for the results of all the tests to be output in a standard format so that analyzing the results becomes an easy task even for someone not completely familiar with the tests being run.

In addition, it is often desirable to be able to have the output of the results of a test in different places or devices. For instance, a user may want to print a summary report for a supervisor while at the same time storing all of the log information in a database which can be queried to analyze the data. This becomes very difficult if the user is using output from a test which the user didn't write and for which the user does not have the source code. A user would likely have to write a parser to parse the different log files and put the data where the user wants it.

From the foregoing it would be an advancement in the art to provide a method for extracting multiple log files of differing formats, converting the extracted log files into a standard format, and write the extracted log files to various devices.

Such an invention is disclosed and claimed herein.

BRIEF SUMMARY AND OBJECTS OF THE INVENTION

The present invention provides a method for extracting desired contents from multiple heterogeneous textual streams to provide normalized data which represents the desired contents. The invention selects input streams containing text data wherein the text data of one input stream is a different format and content than the text data of another input stream. The invention further selects a first set of parse rules corresponding to one input stream and a second set of parse rules, distinct from the first set, which correspond to a second input stream. The invention extracts desired contents from the input streams and provides normalized data which represents the desired contents. The invention selects an output interface and adapts the normalized data representing the desired contents to the output interface. The invention sends the normalized data to the output interface and the output interface is instructed to transform and format the normalized data into device specific data.

The invention includes data structures stored on a memory device which include inputted textual streams which contain the desired contents. The data structures comprise an opening module for opening the textual streams and an extraction module for extracting the desired contents from the textual streams. Device configuration data is also included within the data structures and serves to define a configuration of the output interface. The device configuration data comprises identification data for identifying an output device and comprises format data for formatting the normalized data. The data structures further comprise parse rules which are associated with the textual streams defining locations of the desired contents relative to other textual data in the textual streams. Finally, the data structures comprise output interface modules which are executable by a processor for processing the device configuration data, receiving the normalized data, and formatting the normalized data to provide device specific data.

Thus, it is an object of the invention to provide a process for extracting desired contents from multiple heterogeneous or homogeneous textual streams in accordance with applicable parse rules.

It is another object of the invention to collate the desired contents into normalized data.

It is yet another object of the invention to format the normalized data representing the desired contents into device specific data for one or more output interfaces devices and writing the normalized data to the one or more output interfaces.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

The invention disclosed herein allows a user to convert log files into a standard format which can be written to any number of different "report devices." The reporting process is referred to herein as Automated Test Harness (ATH) Reporting. Automated Test Harness reporting is discussed in U.S. patent application Ser. No. 08/518,160 which is hereby incorporated by reference In one presently preferred embodiment, ATH Reporting will accomplish this by parsing the log files using a set of parsing rules which are defined by the user in a file called an HRF file (Harness Report File). This allows the user to be able to parse the different log files without having to write a parser for every log file. Instead the user simply defines the rules for parsing a file.

ATH Reporting uses special rules to define how to convert the text within log files into records which can be written to many different reporting platforms or devices. A process called the Report Server is responsible for deciphering the rules and parsing the log files in order to obtain the records. The Report Server also controls one or more report devices which process the records obtained from the log files and places the information in their respective formats.

A report device can be designed to produce the exact type of report needed. For example, one report device might calculate and report the average number of errors per program, while another report device might build a table of all error messages produced by the program. Yet both of these report devices would operate on the same set of records.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 5, is not intended to limit the scope of the invention, as claimed, but is merely representative of the presently preferred embodiments of the invention. The presently preferred embodiments of the invention will be best understood by reference to the drawings, wherein like parts are designated by like numerals throughout.

Figure 1:
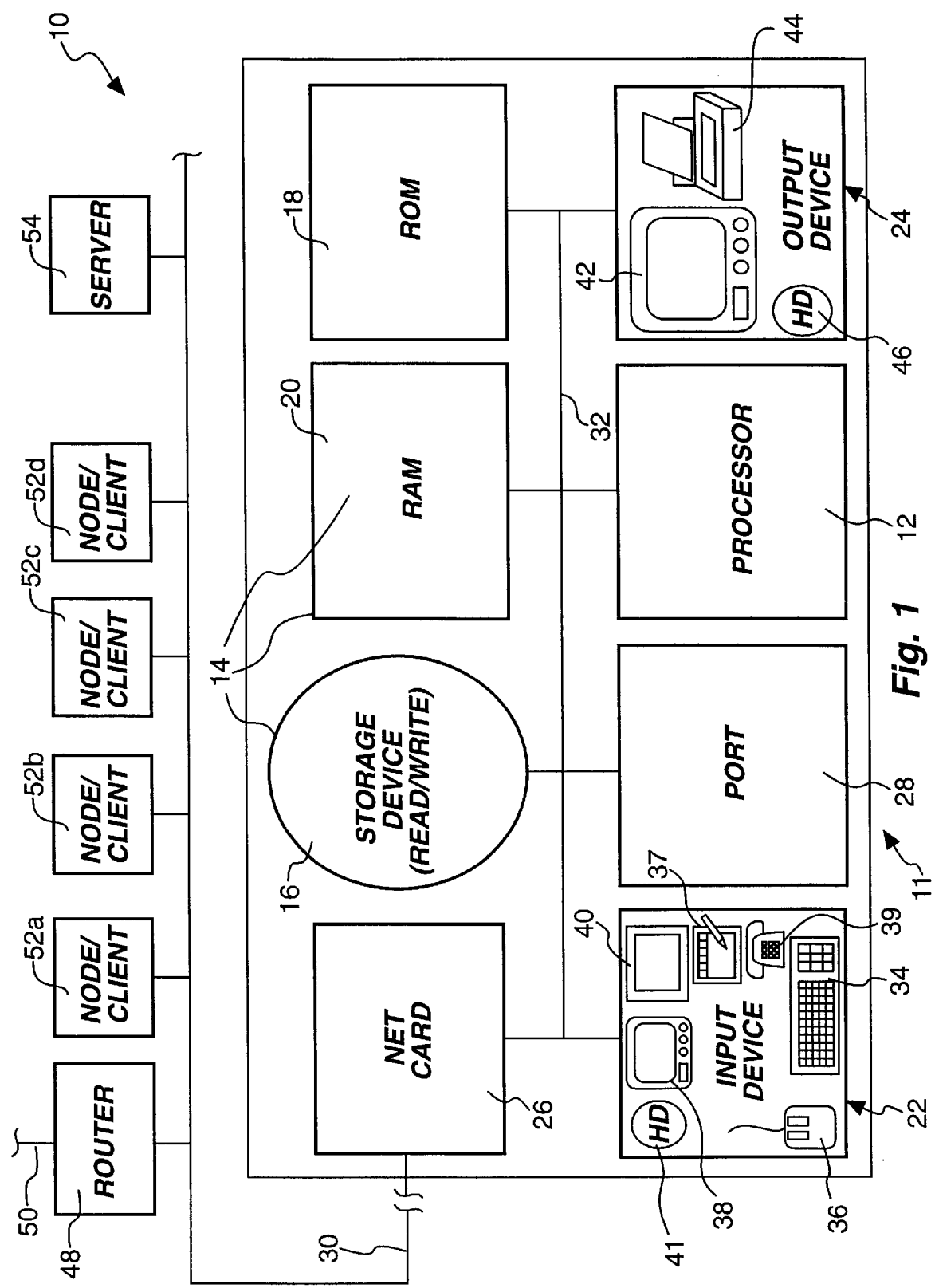
FIG. 1 is a block diagram of the hardware apparatus that may be used in accordance with the present invention.

Referring to FIG. 1, an apparatus 10 may implement the invention on one or more nodes 11, (client 11, computer 11) containing a processor 12 or CPU 12. All components may exist in a single node 11 or may exist in multiple nodes 11, 52 remote from one another. The CPU 12 may be operably connected to a memory device 14. A memory device 14 may include one or more devices such as a hard drive or non-volatile storage device 16, a read-only memory 18 (ROM) and a random access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36 or stylus pad 37. A touch screen 38, a telephone 39, or simply a telephone line 39, may be used for communication with other devices, users, or the like. Similarly, a scanner 40 may be used to receive graphical inputs which may or may not be translated to other character formats. A memory device 41 of any type (e.g. hard drive, floppy, etc.) may be used as an input device, whether resident within the node 11 or some other node 52 on the network 30, or from another network 50.

Output devices 24 may likewise include one or more physical hardware units. For example, in general, the port 28 may be used to accept inputs and send outputs from the node 11. A monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 11, 52, 54) may have various communication capabilities.

In certain embodiments, a minimum of logical capability may be available in any node 52. Note that any of the individual nodes 11, 52, 54 may be referred to, as may all together, as a node 11 or a node 52. Each may contain a processor 12 with more or less of the other components 14–44.

A network 30 may include one or more servers 54. Servers may be used to manage, store, communicate, transfer, access, update, and the like, any practical number of files, databases, or the like, for other nodes 52 on a network 30. Typically, a server 54 may be accessed by all nodes 11, 52 on a network 30. Nevertheless, other special functions, including communications, applications, directory services, and the like may be implemented by an individual server 54 or multiple servers 54. A node 11 may be a server 54.

In general, a node 11 may need to communicate over a network 30 with a server 54, a router 48, or nodes 52 or server 54. Similarly, a node 11 may need to communicate over another network (50) in an internetwork connection with some remote node 52. Likewise, individual components 12–46 may need to communicate data with one another. A communication link may exist, in general, between any pair of devices. The process and method of the invention may be performed on the hardware structure illustrated in FIG. 1.

Figure 2:
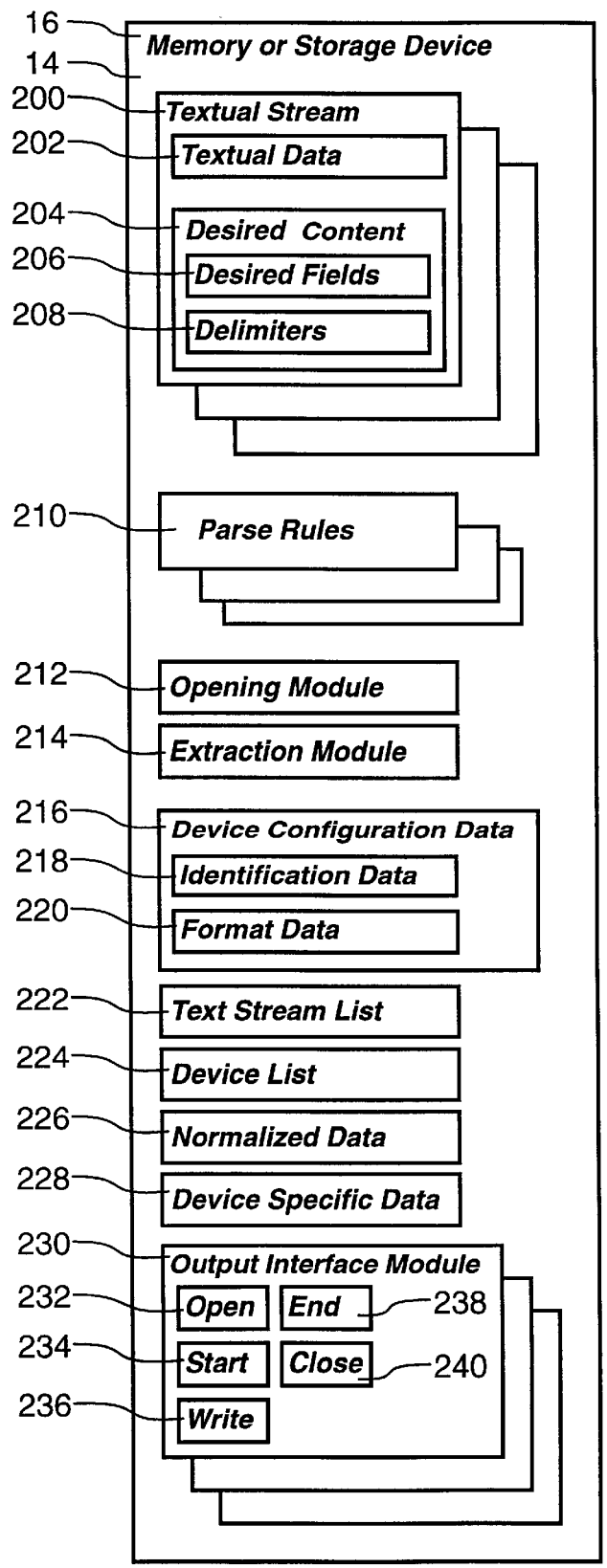
FIG. 2 is a structure diagram illustrating data structures of the storage device of the present invention.

FIG. 2 illustrates the data structures that may be stored in a computer readable medium. The computer readable medium may comprise the memory device 14, including the storage device 16, ROM 18, or the RAM 20. The computer readable medium may also consist of floppy disk or compact disk accessed through the memory device 41. Other forms of computer readable mediums known by one of skill in the art may also be used and are included within the scope of the invention. One skilled in the art will appreciate that portions of the data structures may be stored in various computer readable mediums such as the storage device 16, ROM 18, RAM 20, floppy disk, or compact disk. In one presently preferred embodiment, the data structures are stored in the memory device 14 as discussed below.

FIG. 2 illustrates one or more textual streams 200 which may be stored in the memory device 14. As indicated, the textual streams 200 may be heterogeneous with respect to one another. Each textual stream 200 may comprise textual data 202 including desired contents 204. The desired contents 204 are those pieces of data that a user wishes to extract from the input textual stream 200. Typically one or more desired fields 206 make up the desired contents 204 of a textual stream 200. The desired fields 206 are often defined and/or located by their location relative to a delimiter 208.

The memory device 14 may also contain one or more sets of parse rules 210 associated with the textual streams 200 defining locations of the desired contents 204 relative to other textual data in the textual streams 200. Typically there will be one set of parse rules 210 for each type of input textual stream 200. In one embodiment of the present invention three different types, i.e. heterogeneous, of textual streams 200 may be processed as represented in FIG. 2. Accordingly, there may be three different sets of parse rules 210 wherein each set of parse rules 210 defines where the desired contents are in a particular type of file.

An opening module 212 may also be stored in the memory device 14. The opening module 212 may be a related set of instructions executable by the processor 12 to open the input textual streams 200.

An extraction module 214 may be further provided on the memory device 14 to extract the desired contents 204 from the input textual streams 200. Extracting may include parsing each input textual stream according to the parse rules 210 associated therewith to obtain the desired contents 204.

The memory device 14 may also contain device configuration data 216. The device configuration data 216 may define a configuration of the output interface including identification data 218 for identifying an output device and including format data 220 for formatting normalized data.

A text stream list 222 may be stored on the memory device 14. The text stream list 222 may be a file containing a list of the textual streams 200 to be processed in accordance with the present invention.

A device list 224 may be stored on the memory device 14. The device list 224 is a file that may identify the logical output devices that are to receive the collated and formatted desired contents.

Normalized data 226 may be stored on an operably connected memory device 14. The normalized data 226 may be stored one record at a time. The normalized data 226 may also be stored as more than one record. In some embodiments, the present invention may build up the entire set of desired contents 204 into one set of normalized data 226 before the normalized data 226 is sent out to any logical output devices. It will be appreciated by one skilled in the art that other suitable approaches may be taken.

Device specific data 228 may also be stored on the memory device 14. Device specific data 228 is normalized data 226 which has been processed for a specific logical output device.

One or more output interface modules 230, each executable by the processor 12, may be stored on the memory device 14. The output interface modules 230 may be used for processing the device configuration data 216, for receiving the normalized data 226, and for formatting the normalized data 226 into device specific data 228. The output interface modules 230 contains a common application program interface (API) with standard function calls for interfacing with logical output devices. The function calls listed in FIG. 2 include an open call 232, a start call 234, a write call 236, an end call 238, and a close device call 240.

Figure 3:
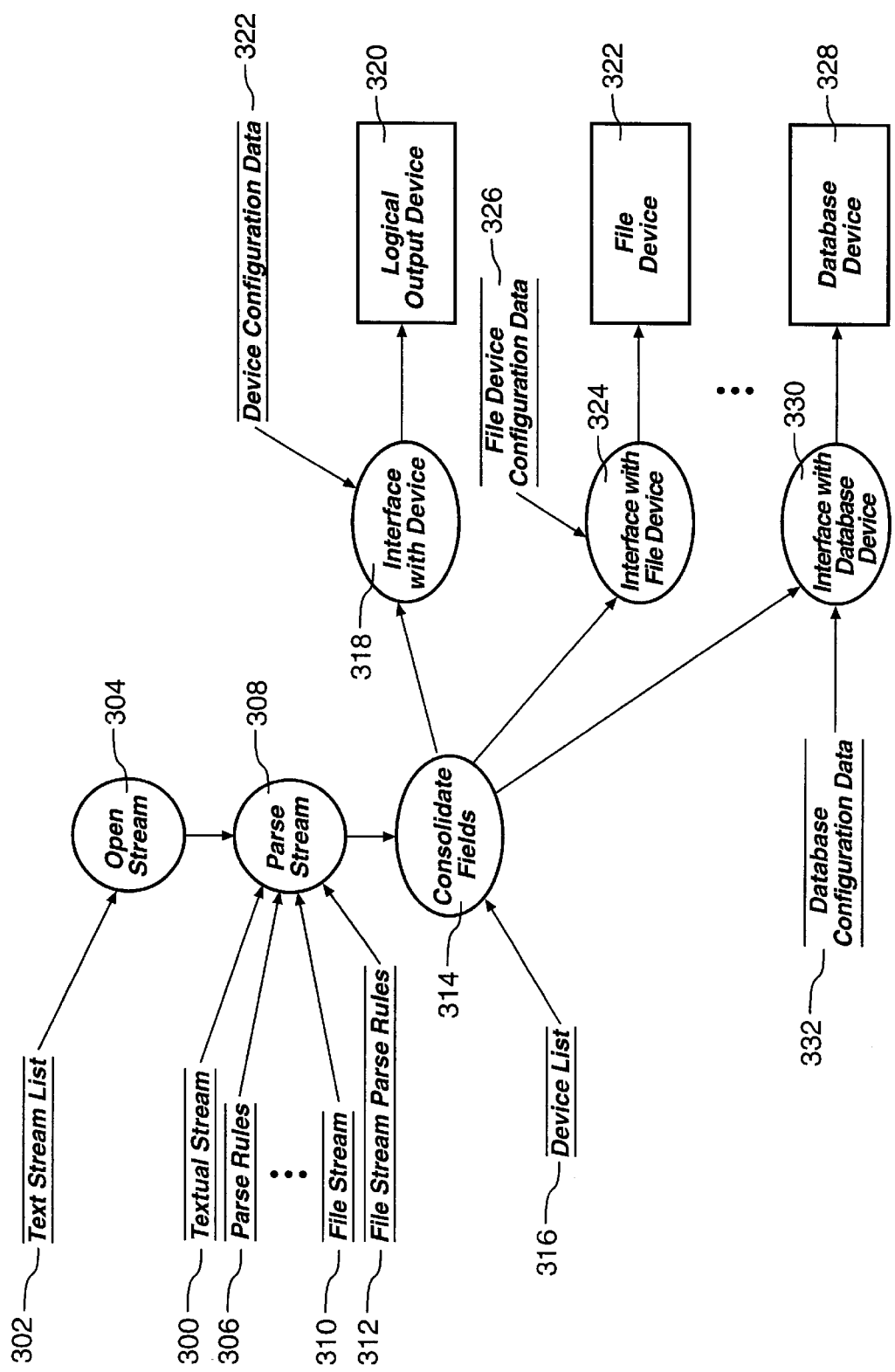
FIG. 3 is a thread diagram illustrating process steps that may be taken in accordance with one presently preferred embodiment.

FIG. 3 illustrates in a data flow diagram one presently preferred process for extracting desired contents from multiple heterogeneous textual streams 300. The present invention may be used to extract desired contents from one or more heterogeneous textual streams 300. Initially, the textual stream or streams 300 that are to be processed may be identified by a text stream list 302. In one presently preferred embodiment, the text stream list 302 may be a file containing a list of the textual streams 300 to be processed by an apparatus and methods in accordance with the present invention. In an alternative preferred embodiment, the text stream list 302 may include a list of many text streams from which a user may select one or more textual streams to be processed.

Each textual stream 300 contains textual data. Included in the textual data are the desired contents which are the pieces of data that a user wishes to extract from the textual streams.

An open stream process 304 may read in the list of text streams 300 to be processed from the text stream list 302. The open stream process 304 may then open the text streams 300 to be processed thereby receiving a stream identification ("ID") for each opened text stream 300.

The text stream list 302 may also include an identification for a set of parse rules 306 for each type of textual stream 300 to be processed. In one presently preferred embodiment, this identification may be a file name containing the parse rules 306 for a particular type of file. The open stream process 304 may pass one or more stream IDs and identifier for the respective set of parse rules 306 to a parse stream process 308.

The parse stream process 308 may, using the parse rules ID for a particular textual stream 300, open the set of parse rules 306 for that particular textual stream 300. The set of parse rules 306 tells the parse stream process 308 how to extract the desired contents from a particular type of textual stream 300. The parse rules 306 indicate what and where the desired contents are. The parse rules 306 may identify the desired contents by enumerating the pieces of data, for that particular file type, which are to be extracted from the textual stream 300. The pieces of data to be extracted may be referred to as the desired fields. The desired fields may be found by the parser by their location next to delimiters.

By opening, reading, and processing the information contained in the parse rules 306, the parse stream process 308 may be sufficiently configured to extract the desired contents from the input textual stream 300.

The parse stream process 302 may iteratively extract the desired contents from each of the textual streams 300. This may be done by opening a first input textual stream, extracting the desired contents from this first input stream by using the information provided in the associated set of parse rules, and then closing this first input stream. Subsequently, a second input textual stream may be likewise processed. This process may iterate until all the streams identified in the text stream list 302 have been processed extracting the desired contents therefrom. One skilled in the art will appreciate that the streams may be processed in parallel, i.e., at the same time, rather than iterating through each one singly. The principles of the present invention enunciated herein may be implemented in a variety of ways within the scope of the present invention.

The present invention may extract desired contents from multiple textual streams 300. The textual streams 300 may all be of the same type, that is, the streams may be homogeneous. Homogeneous textual streams 300 are of the same type. For example, textual files created by the same computer program with the same type of data formatted in the same way are homogeneous. Textual streams 300 that are homogeneous may all use one set of parse rules 306 because of the streams' homogeneity.

Textual streams 300 may be of different types, that is, the streams may be heterogeneous with respect to each other. Streams of different types are typically created by different computer programs or processes and have differing data formats. Differing data formats refers to the fact that the desired contents may be different; the desired contents of one stream file may be different from the desired contents of another. One skilled in the art will realize that a variety of types of textual streams may be processed with an embodiment of the present invention. Different types of input textual streams may include a file stream 310 which would have a set of applicable file stream parse rules 312.

The consolidate fields process 314 receives the desired contents from the parse streams process 308 and provides normalized data representing the desired contents. Although the desired contents may come from multiple heterogeneous textual streams, the consolidate fields process 314 combines all the desired contents into a single uniform set of normalized data. The normalized data is sent to each output interface 318. Accordingly, each output interface 318 need only process one type of data, which is the normalized data.

A device list 316 may identify the logical output devices that are to receive the collated and formatted desired contents. The device list 316, in one preferred embodiment, may be a file stored on the memory device 14 and operably connected to the processor 12. The device list 316 may also identify the output interface modules 318 associated with the logical output devices 320. Typically one output interface module 318 is associated with one logical output device 320.

In addition to identifying the logical output devices 320, the device list 316 may also identify device configuration data 322 for each logical output device 320. In one presently preferred embodiment, there may be a file containing device configuration data 322 for each logical output device 320. Accordingly, the device list 316 may contain a list of devices and each device in the list may have a portion of, or an entire file associated therewith, also listed in the device list 316, containing device configuration data 322 for that logical output device 320.

The consolidate fields process 314 may read in the device list 316 to ascertain which interfaces 318 are to be used in processing the desired contents. The consolidate fields process 314 may also pass the appropriate device configuration data identifier to each output interface 318 with which it is passing data. Thus, each output interface 318 may identify and access the device configuration data 322 for an associated logical output device 320.

The device configuration data file, or files, may contain identification data and formatting data. The identification data may specifically identify the logical output device 320 and enable the associated output interface module 318 to interface with the logical output device 320.

The formatting data may contain data instructive to the output interface module 318 regarding how the data sent to the logical output device 320 needs to be formatted. The output interface 318 receives the normalized data and reformats and/or repackages the data into device specific data using the formatting data.

The output interface 318 receives the normalized data and is executable by the processor 12 to transform the normalized data into device specific data. As stated previously, an API may be used in interfacing with logical output devices. The function calls listed in FIG. 2 on the API may also be stored in memory device 14 and/or the storage device 16. The API may include an open call, a start call, a write record call, an end call, and a close device call. The formatting data of the device configuration data 322, for each logical output device 320, enables the associated output interface 318 to transform the normalized data into device specific data.

After each output interface 318 formats the normalized data into the device specific data, corresponding to a logical output device 320, the output interface 318 writes the device-specific data to its associated logical output device 320. As illustrated in FIG. 3, there may be a plurality of logical output devices 320 having the extracted data written thereto. FIG. 3 generally illustrates an output interface 318 and an accompanying logical output device 320. Some examples of logical output devices are shown in FIG. 3 such as a file device 322 with a respective file device output interface 324 and accompanying file device configuration data 326. A further example of a logical output device 320 is a database device 328 with a respective database device output interface 330 and accompanying database configuration data 332. Other examples of logical output devices include a text stream device a monitor device, and a printer device.

Figure 4:
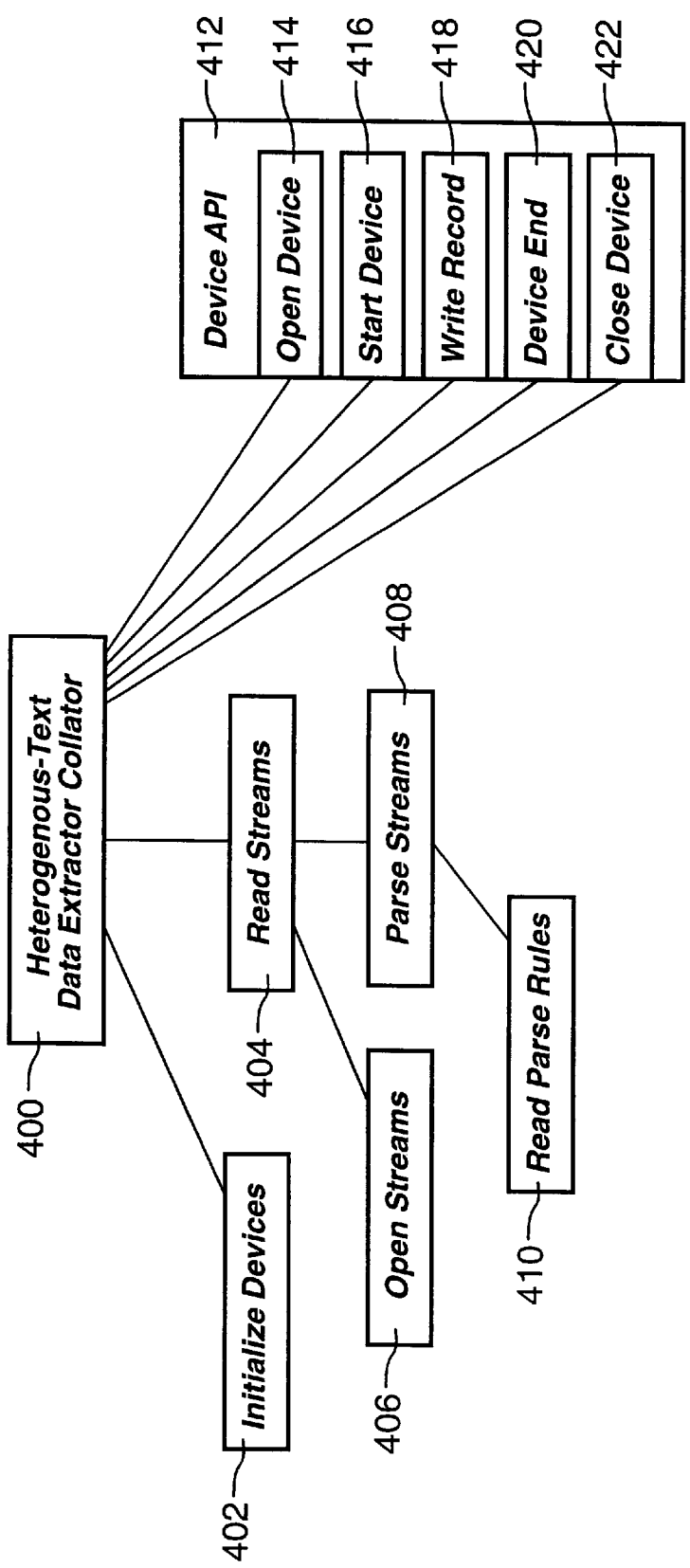
FIG. 4 is a structure chart of one presently preferred embodiment of the invention.

FIG. 4 illustrates, in one presently preferred embodiment, a structure chart of the present invention. The structure chart depicts, at a high level, one possible hierarchy of a program including function calls to achieve data extraction from multiple heterogeneous textual streams. The structure chart of FIG. 4 illustrates one possible high-level hierarchy of function calls. One skilled in the art will appreciate that there are many changes that could be made to the hierarchy of a program made in accordance with the present invention without departing from the inventive principles set forth herein.

At the top level of the structure chart may be a program designed to achieve data extraction from multiple heterogeneous textual streams. This program may be referred to as the heterogeneous-text data extractor collator 400.

The heterogeneous-text data extractor collator 400 may make a call to an initialize devices function 402 to initialize the logical output devices that are to receive the normalized data.

The heterogeneous-text data extractor collator 400 may make a call to read streams 404. The read streams function 404 may open and parse the input textual streams and may also read in data from the parse rules associated with the input streams. To accomplish these tasks, the read streams function 404 may make calls to other functions.

In one presently preferred embodiment, the read streams 404 may call open streams 406 to open one or more input textual streams. The open stream function 406 may correspond to the open streams process 406 of FIG. 2.

After opening the streams, the read streams function 404 may call the parse streams function 408 to parse the input streams to extract the desired contents therefrom. Before parsing the input textual streams, the parse streams function 408 may call the read parse rules function 410 for that particular type of input textual stream. The read parse rules function 410 may include both reading in the parse rules and configuring the parser to parse the input stream thereby extracting, or copying, the desired contents therefrom.

As shown in FIG. 4, there may be a common Device API 412 for interfacing with a logical output device. Using a common Device API 412 for each logical output device may make it easier to interface with output devices because a standard, known interface may be relied upon by both the heterogeneous-text data extractor collator and by those writing the output interfaces actually driving the logical output devices.

Several different calls may be included in the Device API 412. An open device call 414 may be provided to open the logical output device. The open device call 414 may be used with the step of opening the device and a start device call 416 may be used with the step of starting the device. A write record call 418 may also be provided to write or send normalized data to a logical output device. As mentioned, several different types of devices may be used as logical output devices. The logical output device may be a text stream device, a file device, a database device, a monitor device, and a printer device. One skilled in the art will appreciate that the write record call 418 may, and most likely will, be different for each different type of logical output device. To illustrate, the write record call 418 for a file device may need to write data to an open file. In contradistinction, a write record call 418 for a database device may need to use a database call to insert the record into a database.

A device end call 420 may be provided, corresponding to the step of ending the device. This call may be used to write additional data outside of the data written with the write record call 418.

A close device call 422 may be used to close the associated logical output device.

Figure 5:
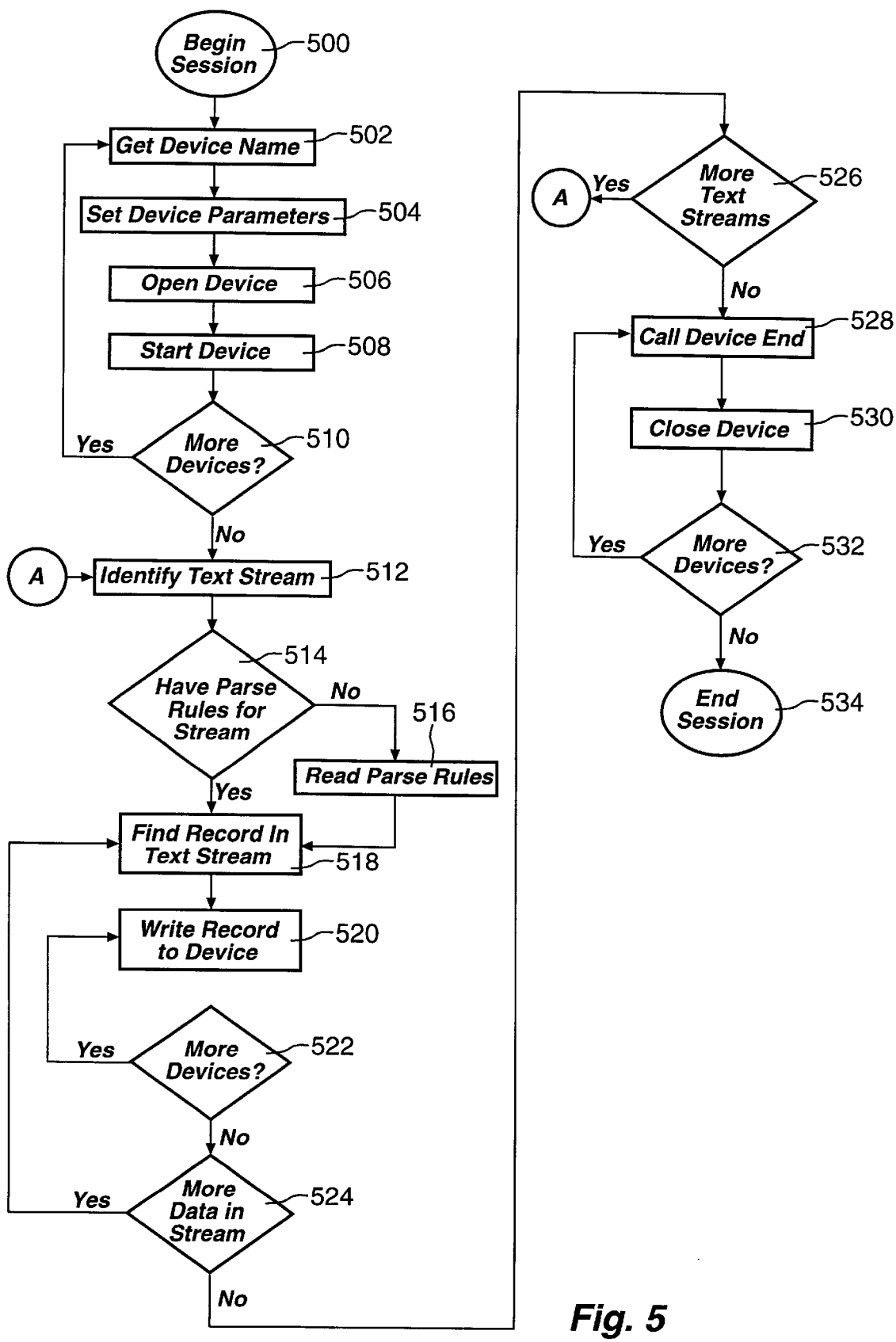
FIG. 5 is a flow diagram which illustrates the processes and data structures which may be performed and created in accordance with the teachings of the present invention.

FIG. 5 illustrates one presently preferred embodiment of a method for extracting desired contents from multiple heterogeneous textual streams. Several of the steps illustrated in FIG. 5 may be performed in a different order than shown. Thus, FIG. 5 is only meant to illustrate one presently preferred embodiment of the present invention and is not meant to limit the scope of the invention.

The entire process of extracting the desired contents from multiple heterogeneous textual streams, collating the desired contents, and writing the desired contents to one or more output interfaces may be referred to as a session.

Initially, a user of the present invention may begin a session as shown in step 500. In beginning a session, a user may execute a program designed in accordance with the principles of the present invention.

After beginning a session, a user may initialize one or more logical output devices. The logical output devices are usually the ultimate. recipients of the collated and formatted desired contents. Initialization of the logical output devices may be achieved through function calls provided by an associated output interface module. An output interface module may be provided for each logical output device thereby providing an output interface for each logical output device.

Initializing a logical output device may involve several steps. The process for extracting data may initially get the particular device name as shown in step 502. This name may be found in the device list. Obtaining the device name may aid in identifying the particular device.

Once the device has been identified, device parameters may be set as shown in step 504. This may be done through an output interface associated with the particular logical output device.

The process for extracting data may open the device as shown in step 506. Depending upon the type of device being opened, several parameters may be required to open the device. In addition, several parameters may be returned during or after the device has been opened.

Often the normalized data that is to be written to the output devices may include information at the beginning of the data conveying necessary pieces of information about the information in the file. For example, if the normalized data was to be written to a file device, the file may typically include a header at the beginning of the file telling what types of information are contained in the file and where. The start device step 508 may be used to write this initialization data to the logical output device.

As indicated, in one presently preferred embodiment of the present invention, the normalized data may be sent to a plurality of output interfaces where the plurality of output interfaces are associated with a plurality of logical output devices. To process multiple output devices being written to, the process for extracting data may query whether more devices need to be initialized as shown in step 510. If more devices need to be initialized, the process may loop back to step 502 and get the name of the next logical output device. If no more devices are to be initialized, the process may proceed to the next step.

In one presently preferred embodiment, the present invention may simply look to the device list to ascertain whether more devices are to be initialized. The device list may be a list of all devices that are to have the normalized data written thereto. In an alternate preferred embodiment, the device list may contain a list of many logical output devices capable of being written to, and a user may be prompted to select which output devices are to be actually written to in this session.

A process in accordance with the present invention may then turn to processing the textual stream or streams. The process may identify an input textual stream containing the desired contents as shown in step 512. Identifying a textual stream to be processed may comprise opening and reading the contents of the text stream list.

Once a text stream has been identified, the process may ascertain whether parse rules for this type of stream have already been identified and/or processed as shown in step 514. If parse rules have not already been identified and/or processed, the process is directed toward step 516 which reads in the parse rules for this type of file.

Reading in the parse rules comprises the process using the parse rules to configure its parser to accurately parse the input textual stream. Parsing may involve locating desired fields within the textual stream and extracting the desired fields from the textual stream. The desired fields may be located by their proximity to delimiters. One or more desired fields may be referred to as a record.

If parse rules for this type of file have already been identified and/or processed, the present invention may simply use these parse rules already identified to extract the desired contents from the input textual stream.

Once the parse rules for the identified textual stream have been identified and/or processed, the present invention may find a record in the textual stream as shown in step 518. This record may include one or more desired fields. Finding the record in step 518 comprises actually finding the record within the stream and extracting the record therefrom. Extracting may refer to making a copy of the record found, not necessarily taking the record out of the stream thereby deleting it.

In one presently preferred embodiment, after a record has been found and extracted, the record may be written to the logical output devices as shown in step 520. The record may be written to an output device. Subsequently, the process may query whether there are more devices to write to as shown in step 522. If there are more devices, the process may proceed to step 520 to write the record to the next logical device. This writing the record may be iterated until the record has been written to all the logical devices.

After the record has been written to all the logical devices, the process for extracting data may proceed to step 524 to make a decision as to whether there is more data in the input stream to parse through. If there is more data in the input stream to parse through, the process may proceed to step 518 to find the next record in the textual stream. After the next record is found and extracted, that next record may be iteratively written to the logical output devices.

If there is no more data in the input stream to parse through, the process may then proceed to step 526 to ascertain whether there are more textual streams to process. If there are more input textual streams, the method for extracting data may proceed to step 512 to identify the next textual stream to parse through, and continue through the aforementioned steps as indicated in FIG. 5.

If there are no more input textual streams to process, the method for extracting data may proceed to step 528 to then finalize the normalized data by calling a device end call for the logical output device. The device end call may write any data a user deems helpful to add to the end of the normalized data. The device end call is analogous to the device start call in that it may write normalized data outside of the process of data extraction.

The method for extracting data then proceeds to step 530 to close the logical device after the device end has been called. Closing the device may end the writing of normalized data to the logical output device. After the device has been closed, the method proceeds to step 532 and cycles through any other logical output devices being used with the present invention. In step 532 the process queries whether there are more devices that need to be ended and closed. If there are more devices, the present invention proceeds to step 528 and calls the device and then proceeds to step 530 to close the device for each successive logical output device. The closing of devices could be done in a multi-threaded fashion.

If there are no more devices to end and/or close, the present invention proceeds to step 534 to end its session of extracting and collating data from multiple heterogeneous input textual streams.

From the above discussion, it will be appreciated that the present invention provides a method for extracting desired contents from multiple textual streams of differing formats or uniform formats based on applicable parse rules. The present invention further provides a method for converting the extracted desired contents into a standard format which can be formatted specifically for various logic output devices. The present inventions provides a method for interfacing with the various logic output devices and writing to the logic output devices.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by united states Letters Patent is:

1. A method for extracting desired contents from multiple heterogeneous textual streams to provide normalized data, the method comprising:
   selecting, by a user, a plurality of input streams, the plurality of input streams comprising a first input stream of text data and second input stream of text data heterogeneous with respect to the first input stream;
   selecting, by a user, a first set of parse rules corresponding to the first input stream and a second set of parse rules corresponding to the second input stream and distinct from the first set of parse rules;
   selecting a first output interface;
   extracting desired contents from the plurality of input streams; and
   providing normalized data representing the desired contents, and adapted to the output interface.

2. The method of claim 1, further comprising sending the normalized data to the first output interface, the first output interface being executable by a processor to transform the normalized data into device specific data.

3. The method of claim 2, further comprising:
   formatting, by the first output interface, the normalized data into the device specific data, the device-specific data corresponding to a logical output device; and
   writing the device-specific data to the logical output device.

4. The method of claim 3, wherein the logical output device is selected from a text stream device, a file device, a database device, a monitor device, and a printer device.

5. The method of claim 2, further comprising sending the normalized data to a plurality of output interfaces, including the first output interface, the plurality of output interfaces being associated with a plurality of logical output devices.

6. The method of claim 5, further comprising:
   providing, by each output interface of the plurality of interfaces, device specific data corresponding to a respective, corresponding, logical output device of the plurality of logical output devices; and
   sending the device specific data to the respective, corresponding, logical output device.

7. The method of claim 5, wherein the plurality of logical output devices is heterogeneous.

8. The method of claim 5, wherein each logical output device of the plurality of logical output devices is selected from a text stream device, a file device, a database device, a monitor device, and a printer device.

9. The method of claim 1, wherein the desired contents comprise desired fields defined by delimiters.

10. The method of claim 1, wherein extracting comprises parsing each input stream according to the parse rules associated therewith to obtain the desired contents.

11. The method of claim 1, wherein providing the normalized data comprises consolidating and formatting the desired contents.

12. The method of claim 1, wherein the input streams are selected from a file and a data stream.

13. A computer system for extracting desired contents from multiple heterogeneous textual streams to provide normalized data to a first output interface, the system comprising:
- a processor programmed to open multiple heterogeneous input streams, selectable by a user, and parse the input streams according to parse rules, selectable by a user, the processor further programmed to extract desired contents from the input streams and consolidate the desired contents into normalized data;
- memory operably connected to the processor for storing data structures, the data structures including:
  an opening module for opening the input streams;
  a parsing module for parsing the input streams;
  an extraction module for extracting the desired contents from the input streams; and
- the first output interface for transforming the normalized data into device specific data.

14. The computer system of claim 13, further comprising a storage device operably connected to the processor for storing the normalized data and the parse rules.

15. The computer system of claim 13, further comprising a logical output device operably associated with the first output interface for receiving the device specific data.

16. The computer system of claim 15, wherein the logical output device is selected from a text stream device, a file device, a database device, a monitor device, and a printer device.

17. The computer system of claim 13, further comprising a plurality of heterogeneous output interfaces, including the first output interface, the plurality of output interfaces being associated with a plurality of logical output devices for sending device specific data thereto.

18. A computer readable medium storing data structures for extracting desired contents from multiple heterogeneous textual streams to provide normalized data representing the desired contents to a first output interface module adapted to format the normalized data, the data structures comprising:
- portions of the textual streams;
- an opening module for opening the textual streams;
- an extraction module for extracting the desired contents from the textual streams;
- device configuration data defining a configuration of the first output interface module including identification data for identifying an output device and including format data for formatting the normalized data;
- parse rules, selectable by a user and associated with the textual streams defining locations of the desired contents relative to other textual data in the textual streams; and
- the first output interface module executable by the processor for processing the device configuration data, receiving the normalized data, and formatting the normalized data to provide device specific data.

19. The computer readable medium of claim 18, further comprising a plurality of output interface modules, including the first output interface module, the plurality of output interface modules being associated with a plurality of logical output devices.

20. The computer readable medium of claim 19, further comprising a list of logical output devices including the plurality of logical output devices.

* * * * *